(12) United States Patent
Kanno

(10) Patent No.: US 12,535,397 B2
(45) Date of Patent: Jan. 27, 2026

(54) MOISTURE METER

(71) Applicant: A&D COMPANY, LIMITED, Tokyo (JP)

(72) Inventor: Masahiro Kanno, Saitama (JP)

(73) Assignee: A&D COMPANY, LIMITED, Tokyo (JP)

( * ) Notice: Subject to any disclaimer, the term of this patent is extended or adjusted under 35 U.S.C. 154(b) by 136 days.

(21) Appl. No.: 17/779,503

(22) PCT Filed: Nov. 28, 2019

(86) PCT No.: PCT/JP2019/046495
§ 371 (c)(1),
(2) Date: May 24, 2022

(87) PCT Pub. No.: WO2021/106129
PCT Pub. Date: Jun. 3, 2021

(65) Prior Publication Data
US 2022/0412860 A1 Dec. 29, 2022

(51) Int. Cl.
*G01N 5/04* (2006.01)
(52) U.S. Cl.
CPC .................... *G01N 5/045* (2013.01)
(58) Field of Classification Search
CPC ..................................................... G01N 5/045
USPC .............................................................. 73/76
See application file for complete search history.

(56) References Cited

U.S. PATENT DOCUMENTS

| 4,798,252 A | * | 1/1989 | Knothe | F26B 9/003 |
| | | | | 177/180 |
| 4,889,201 A | * | 12/1989 | Oldendorf | F26B 9/003 |
| | | | | 177/25.14 |
| 2004/0089806 A1 | | 5/2004 | Murakami et al. | |

(Continued)

FOREIGN PATENT DOCUMENTS

| CN | 102117037 A | 7/2011 |
| CN | 102466665 A | 5/2012 |

(Continued)

OTHER PUBLICATIONS

A&D Company Limited, Moisture Analyzers MS-70/MX-50/MF-50/ML-50, Test with The Best, Interntional Div., A&D Company, Limited, Version 2.30M, Dec. 2009 (Year: 2009).*

(Continued)

*Primary Examiner* — Marrit Eyassu
(74) *Attorney, Agent, or Firm* — Studebaker Brackett PLLC

(57) ABSTRACT

Provided is a moisture meter including a mass measurement unit for measuring the mass of a specimen, a heater for heating the specimen, a control arithmetic unit configured to control the heating unit to heat the specimen until a change in the mass of the specimen becomes not more than a predetermined threshold and calculate the moisture content of the specimen, a timepiece for measuring a heating time, and a storage unit. The control arithmetic unit measures the moisture content of a standard substance for inspection and a heating time, diagnoses the presence/absence of an abnormality in the heating unit by comparing a measured heating time with a predetermined time as a set heating time stored in the storage unit in advance.

10 Claims, 8 Drawing Sheets

(56) References Cited

U.S. PATENT DOCUMENTS

| | | | |
|---|---|---|---|
| 2005/0049800 A1* | 3/2005 | Izumo | G05D 22/02 |
| | | | 702/31 |
| 2007/0256479 A1* | 11/2007 | Luchinger | G01N 5/045 |
| | | | 73/76 |
| 2008/0006082 A1 | 1/2008 | Luchinger | |
| 2011/0164889 A1 | 7/2011 | Deng | |
| 2012/0031169 A1* | 2/2012 | Sakamoto | F02D 41/1466 |
| | | | 73/25.05 |
| 2012/0060593 A1* | 3/2012 | Steinrisser | G01N 5/045 |
| | | | 73/73 |
| 2016/0341643 A1 | 11/2016 | Dudda et al. | |

FOREIGN PATENT DOCUMENTS

| | | | |
|---|---|---|---|
| CN | 110274844 A | | 9/2019 |
| EP | 0344465 A2 | * | 12/1989 |
| JP | S6050435 A | * | 3/1985 |
| JP | 2001-221440 A | | 8/2001 |
| JP | 2001227790 A | * | 8/2001 |
| JP | 2003302324 A | * | 10/2003 |
| JP | 2003-344255 A | | 12/2003 |
| JP | 2006118490 A | * | 5/2006 |
| JP | 3993466 B2 | * | 10/2007 |
| JP | 2019-152572 A | | 9/2019 |

OTHER PUBLICATIONS

International Search Report and Written Opinion issued in the corresponding Application No. PCT/JP2019/046495 issued on Feb. 18, 2020.

* cited by examiner

MOISTURE METER

TECHNICAL FIELD

The present invention relates to a moisture meter and, more particularly, to a heating and drying moisture meter.

BACKGROUND ART

Conventionally, a heating and drying moisture meter is known as one of the devices that measure the moisture of a specimen (for example, Patent Literature 1). The heating and drying moisture meter is a device that evaporates the moisture in a specimen by heating the specimen and measures the moisture content of the specimen from a change (decrease) in the mass of the specimen before and after heating.

The heating and drying moisture meter is a relatively inexpensive device and can measure the moisture content of a wide variety of specimens in a relatively short time. Accordingly, heating and drying moisture meters are widely used as moisture meters. In this description, a moisture meter means a heating and drying moisture meter unless otherwise specified.

Patent Literature 1 discloses a moisture meter configured to perform calibration by using a substance whose moisture content is known in advance, such as sodium tartrate dihydrate ($C_4H_4Na_2O_6 \cdot 2H_2O$, hereinafter simply referred to as "sodium tartrate"), as a standard substance for device performance inspection. Sodium tartrate is known to undergo an irreversible crystalline change to release moisture when being heated at a temperature of about 160° C. for about 10 min.

The moisture meter disclosed in Patent Literature 1 compares the measured moisture content of a standard substance with the theoretical moisture content of the standard substance stored in advance in a storage unit, evaluates the comparison result based on a preset evaluation criterion, and calibrates a mass measurement unit so as to equalize the measured moisture content with the theoretical moisture content based on the evaluation result.

CITATION LIST

Patent Literature

Patent Literature 1: Japanese Published Unexamined Patent Application No. 2003-344255

SUMMARY OF INVENTION

Technical Problem

However, the measurement performance of the moisture meter is influenced by not only the state of the mass measurement unit but also other factors especially the state of a heating unit.

In detail, when a halogen lamp as a heating means or a glass cover for protecting a specimen is contaminated or there is an abnormality such as a failure in the halogen lamp itself, the lamp cannot generate heat as expected according to its performance. Therefore, there is a problem that the measurement time may be increased.

Therefore, demands have arisen for the development of a moisture meter that can diagnose the state of a device in consideration of not only factors of a mass measurement unit but also factors other than the mass measurement unit, especially the state of a heating unit.

The present invention has been made in consideration of the above circumstances and has as its object to provide a heating and drying moisture meter that can diagnose the state of a device in consideration of not only factors of a mass measurement unit but also factors other than the mass measurement unit.

Solution to Problem

In order to achieve the above object, a moisture meter according to one aspect of the present invention includes a mass measurement unit configured to measure a mass of a specimen placed on a weighing dish, a heating chamber having the weighing dish placed inside, configured to open and close; a heating unit placed in the heating chamber and configured to heat the specimen; a control arithmetic unit configured to control the heating unit to heat the specimen until a change in mass of the specimen becomes not more than a predetermined threshold and calculate a moisture content of the specimen from the change in the mass of the specimen before and after heating, a timepiece configured to measure a heating time, and a storage unit. The control arithmetic unit includes a standard substance measurement unit configured to measure a moisture content of a standard substance for inspection as the specimen and measure a heating time and an abnormality diagnosis unit configured to diagnose presence or absence of an abnormality in the mass measurement unit by evaluating a measured moisture content with reference to a theoretical moisture content of the standard substance and to diagnose presence or absence of an abnormality in the heating unit by comparing a measured heating time with a predetermined time as a set heating time stored in the storage unit in advance.

In the above aspect, the abnormality diagnosis unit also preferably determines that there is an abnormality in the heating unit when the measured heating time is longer than the predetermined time.

In the above aspect, the standard substance is also preferably a sodium tartrate dihydrate.

In the above aspect, the moisture meter preferably includes a display unit, and the abnormality diagnosis unit displays, on the display unit, a message notifying a user of, as diagnosis results, a location of an abnormality and a measure against a cause.

Benefit of Invention

A heating and drying moisture meter can diagnose the state of a device in consideration of not only factors of a mass measurement unit but also factors other than the mass measurement unit, especially the state of a heating unit.

BRIEF DESCRIPTION OF DRAWINGS

FIGS. 7A-7C-2 are views illustrating examples of a display of abnormality diagnosis results in the inspection mode of the same moisture meter.

DESCRIPTION OF EMBODIMENT(S)

Figure 1:
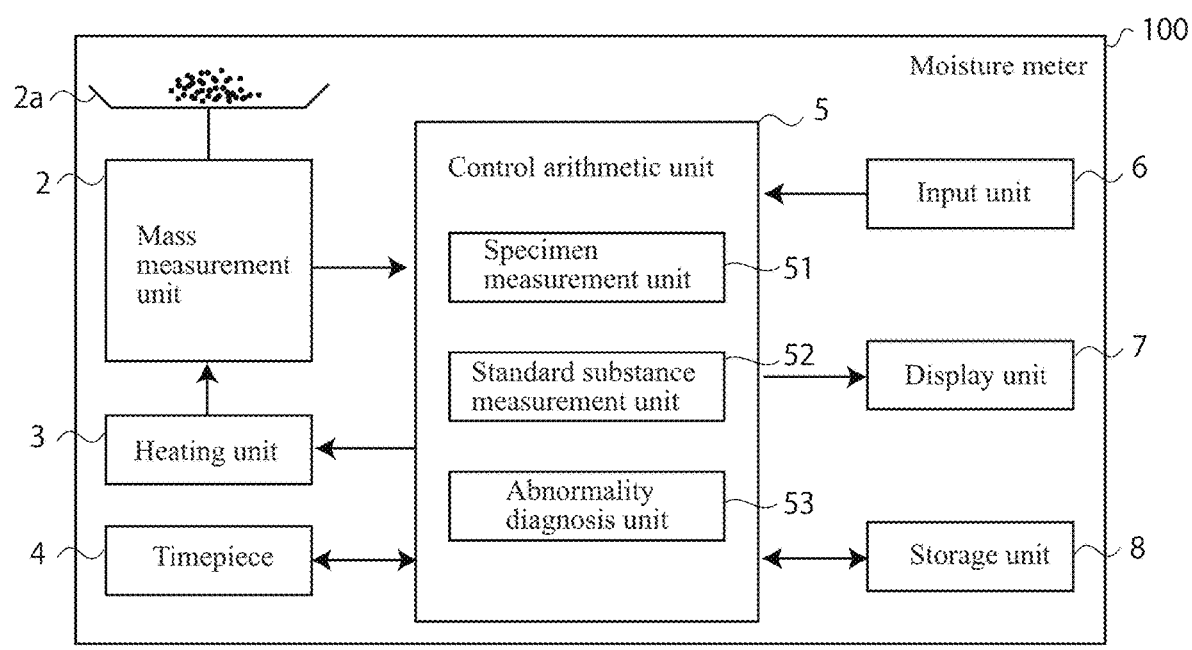
FIG. 1 is a block diagram illustrating the configuration of a moisture meter according to an embodiment of the present invention.

The preferred embodiments of the present invention will be described below with reference to the accompanying drawings. However, the present invention is not limited to them. In each embodiment, the same reference numerals denote the same components, and overlapping description will be omitted as appropriate.

Embodiment

Figure 2:
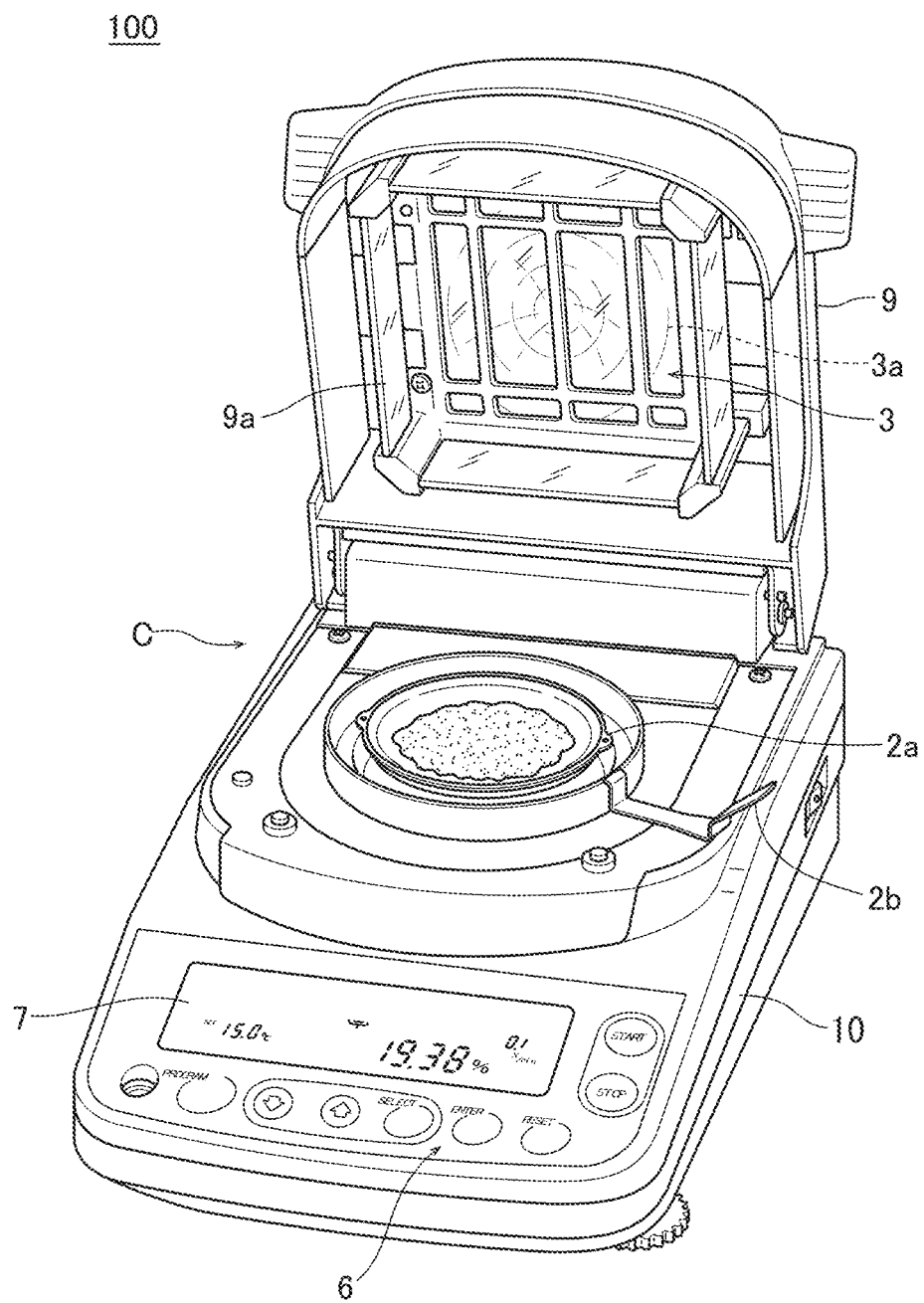
FIG. 2 is a perspective view illustrating a state in which the lid of the heating chamber of the same moisture meter is open.

FIG. 1 is a block diagram illustrating the configuration of a moisture meter 100 according to an embodiment of the present invention. FIG. 2 is a perspective view illustrating a state in which a lid 9 of a heating chamber C of the moisture meter 100 is open. As illustrated in FIG. 1, the moisture meter 100 includes a mass measurement unit 2, a heating unit 3, a timepiece 4, a control arithmetic unit 5, an input unit 6, a display unit 7, and a storage unit 8.

The mass measurement unit 2 is a so-called mass scale such as an electromagnetic balance mass sensor and is connected to a weighing dish 2a on which a specimen is placed. The mass measurement unit 2 measures the mass of the specimen placed on the weighing dish 2a. The mass measurement unit 2 is stored inside a moisture meter main body 10.

The weighing dish 2a is placed in the heating chamber C sealed by closing the openable lid 9 illustrated in FIG. 2. The weighing dish 2a includes a knob 2b and is configured to be detachable with respect to the mass measurement unit 2. The heating chamber C is configured as a space defined by the upper portion of the moisture meter main body 10 and the lid 9 and houses the weighing dish 2a.

The heating unit 3 includes a heating means 3a such as a halogen lamp or a resistance wire that generates Joule heating and a temperature sensor (not illustrated). The heating means 3a heats a specimen under the control of the control arithmetic unit 5 based on an output from the temperature sensor.

The heating means 3a is stored inside the lid 9 of the heating chamber C. The lid 9 includes a glass cover 9a in the form of a container covering the weighing dish 2a to prevent a specimen from coming into contact with the heating means 3a.

The timepiece 4 measures the heating time from when the heating unit 3 starts heating under the control of the control arithmetic unit 5 to when the heating unit 3 stops heating. Note that the timepiece 4 may be incorporated as, for example, a system clock in the control arithmetic unit 5.

The control arithmetic unit 5 is a microcomputer including a CPU (Central Processing Unit) that performs arithmetic processing and a ROM (Read Only Memory) and a RAM (Random Access Memory).

The control arithmetic unit 5 is connected to respective units of the mass measurement unit 2, the heating unit 3, the timepiece 4, the input unit 6, the display unit 7, and the storage unit 8 and executes various operations for implementing the functions of the moisture meter 100.

The control arithmetic unit 5 controls the respective units to execute measurement in the specimen measurement mode, the inspection initialization mode, and the inspection mode. The specimen measurement mode is a normal usage mode of the moisture meter 100, in which the moisture meter 100 measures the moisture content of a specimen whose moisture content is desired to be acquired. The inspection mode is a mode of diagnosing the state of the moisture meter 100. The inspection initialization mode is a mode of acquiring a default value of the heating time, that is, set heating time, for the inspection mode.

The control arithmetic unit 5 also includes a specimen measurement unit 51, a standard substance measurement unit 52, and an abnormality diagnosis unit 53. Each functional unit is implemented by, for example, a program.

In the specimen measurement mode, the specimen measurement unit 51 controls the heating unit 3 to heat the specimen and monitor a change in the mass of the specimen and stops the heating unit 3 when the mass change rate of the specimen becomes a predetermined threshold or less.

The specimen measurement unit 51 calculates a moisture content M of the specimen by using the mass measurement value of the specimen before heating and the mass measurement value after heating according to equation (1).

$$M(\%) = [[(W1 - W2)]/W1] \times 100 \tag{1}$$

(where W1 is the mass measurement value before heating, and W2 is the mass measurement value after heating.)

In the inspection initialization mode and the inspection mode, the standard substance measurement unit 52 measures the moisture content of a standard substance for inspection (hereinafter simply referred to as "standard substance") like the specimen measurement unit 51 and measures the heating time required for measurement of the moisture content of the standard substance.

In the inspection mode, the abnormality diagnosis unit 53 determines whether a measured moisture content Mi of the standard substance falls within a predetermined range with reference to a theoretical moisture content Mt of the standard substance, thereby determining the presence or absence of an abnormality in the mass measurement unit 2.

In the inspection mode, the abnormality diagnosis unit 53 determines the presence or absence of an abnormality in the heating unit 3 by comparing a measured heating time Ti with a set heating time Ts in the inspection initialization mode which is stored at the time of shipment.

The input unit 6 includes operation buttons such as a start button, a stop button, up/down buttons, a selection button, and a determination button and is used to issue instructions to start and stop measurement, set a mode, and select an operation, etc.

The display unit 7 is a liquid crystal display that displays measurement results, a mode selection screen, a message, etc. Note that the input unit 6 and the display unit 7 may be integrated into a touch panel display.

The storage unit 8 is, for example, a nonvolatile semiconductor memory such as a flash memory. The storage unit 8 stores a heating temperature setting and the amount of specimen placed for proper inspection in accordance with the theoretical moisture content of a standard substance and the standard substance. The storage unit 8 also stores the heating time for the standard substance measured in the inspection initialization mode. Furthermore, the storage unit 8 stores messages displayed on the display unit 7 by the abnormality diagnosis unit 53 to notify a user of diagnosis results.

Next, the standard substances used for abnormality diagnosis of the moisture meter 100 will be described. As standard substances, for example, the substances listed in Table 1 can be used, but are not limited to these substances. Sodium tartrate is especially suitable because of high stability and easy handling. With regard to these substances, theoretical moisture content and appropriate heating temperatures for the measurement of moisture content are known.

TABLE 1

Examples of Available Standard Substances

| Substance Name | Theoretical Moisture Content |
|---|---|
| Sodium tartrate dihydrate | 15.66% |
| Sodium citrate dihydrate | 12.4% |
| Sodium tungstate dihydrate | 10.92% |
| Calcium bromide dihydrate | 15.26% |
| Calcium chloride dihydrate | 32.41% |
| Sodium dihydrogen phosphate dihydrate | 20.23% |

Although at least one standard substance may be set, a plurality of standard substances may also be set. In this case, the storage unit 8 stores the theoretical moisture content, appropriate heating temperatures, and the amounts of specimens placed of a plurality of standard substances corresponding to codes respectively assigned to the individual standard substances.

Next, the operations of the moisture meter 100 in the specimen measurement mode, the inspection initialization mode, and the inspection mode will be described.

(Specimen Measurement Mode)

Figure 3:
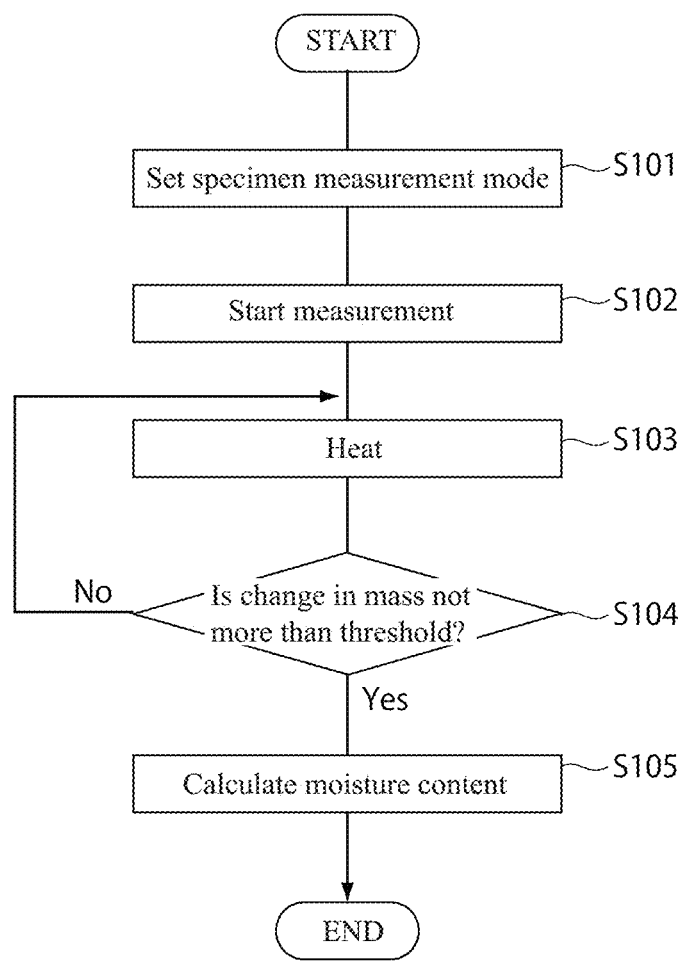
FIG. 3 is a flowchart for an operation in the specimen measurement mode of the same moisture meter.

FIG. 3 is a flowchart for the operation of the moisture meter 100 in a normal usage state, that is, in the specimen measurement mode of the moisture meter 100.

When measuring a specimen, a user sets the moisture meter 100 in the specimen measurement mode via the input unit 6 in step S101. When the specimen measurement mode is set in advance as the normally used mode, step S101 may be omitted.

Next, in step S102, the user places the specimen on the weighing dish 2a, closes the lid 9, sets a heating temperature via the input unit 6, and presses the measurement start button.

Next, in step S103, the specimen measurement unit 51 makes the heating unit 3 start heating. The heating gradually evaporates the moisture of the specimen, and the mass measurement value of the specimen measured by the mass measurement unit 2 gradually decreases with the elapse of time.

The specimen measurement unit 51 monitors a change in this mass measurement value. In step S104, when the change in mass measurement value becomes not more than a predetermined threshold (Yes), the process shifts to step S105. In step S105, the specimen measurement unit 51 causes the heating unit 3 to stop heating, calculate the moisture content M according to equation (1), and stop the measurement upon displaying the calculation result on the display unit 7.

(Inspection Initialization Mode)

Figure 4:
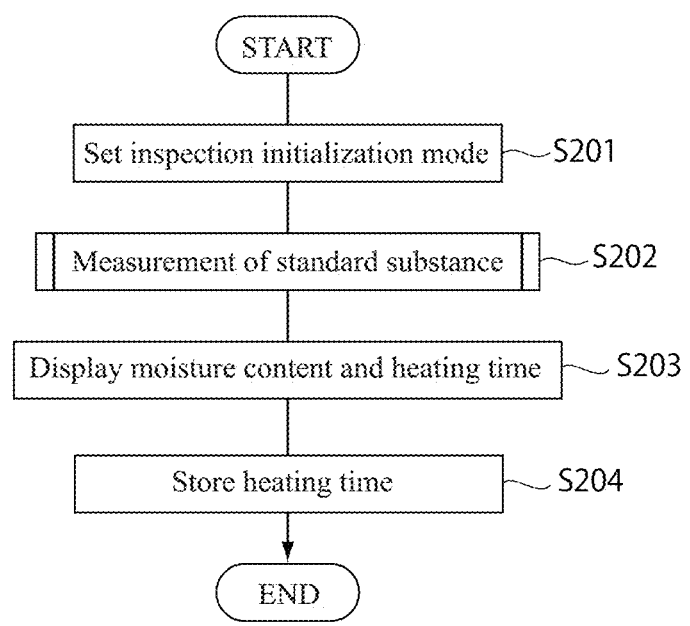
FIG. 4 is a flowchart for an operation in the inspection initialization mode of the same moisture meter.

FIG. 4 is a flowchart for explaining the operation of the moisture meter 100 in the inspection initialization mode. The inspection initialization mode is normally executed at the time of shipment. As a standard substance, sodium tartrate is set.

In step S201, an operator of a maker side sets the inspection initialization mode via the input unit 6. In step S202, the moisture meter 100 measures the standard substance.

Figure 5:
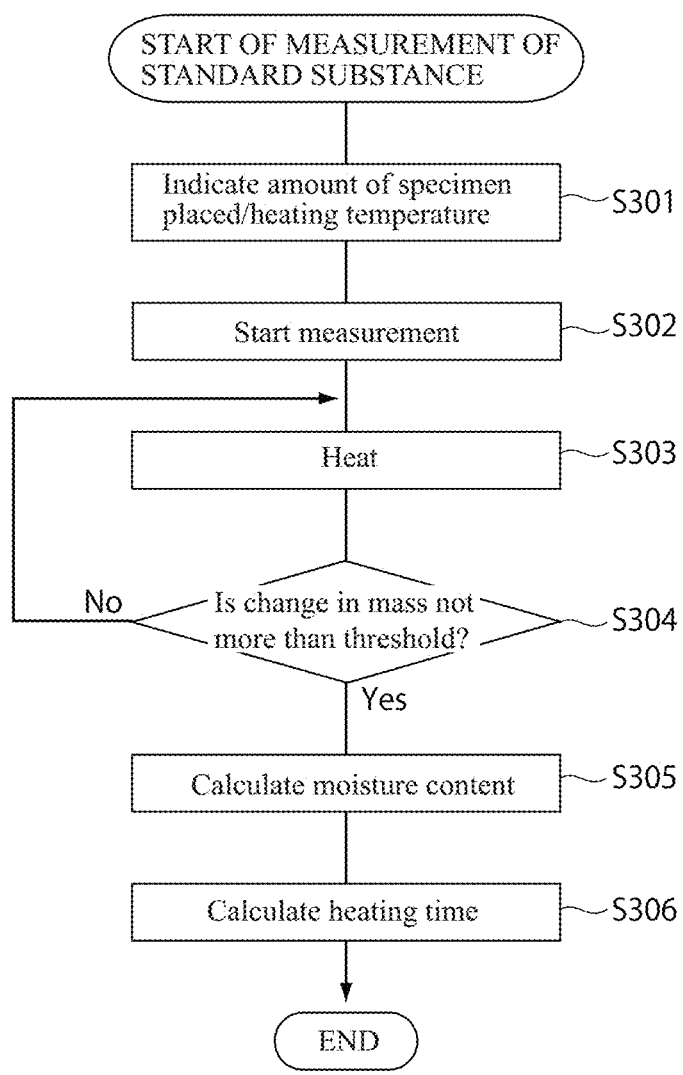
FIG. 5 is a flowchart for an operation in standard substance measurement by the same moisture meter.

A detailed operation in measurement of the standard substance in step S202 will be described with reference to FIG. 5. First, when the measurement of the standard substance starts, the standard substance measurement unit 52 displays, in step S301, the amount of specimen to be placed and the heating temperature setting appropriate for inspection, stored in advance in the storage unit 8 corresponding to sodium tartrate, on the display unit 7 as, for example, the following message:

"Standard Substance: Sodium tartrate (a) Heating temperature setting: 160° C.

(b) Specimen mass: about 5 g"

Next, in step S302, the operator places about 5 g of sodium tartrate on the weighing dish 2a based on an instruction on the display unit 7, sets the sodium tartrate by closing the lid 9, and then starts measurement upon setting the heating temperature setting to 160° C.

A heating temperature may be manually set by the operator or may be automatically set to the corresponding heating temperature by the moisture meter 100 in accordance with the type of standard substance.

Next, in step S303, the standard substance measurement unit 52 starts heating the heating unit 3. The standard substance measurement unit 52 monitors a change in the mass measurement value of the mass measurement unit 2 as in the specimen measurement mode and at the same time measures a heating time T.

When the change in mass measurement value becomes not more than a predetermined threshold in step S304, the standard substance measurement unit 52 stops heating by the heating unit 3 and calculates the moisture content M of the standard substance according to equation (1) in step S305.

At the same time, in step S306, the standard substance measurement unit 52 calculates the time from the start of heating to the end of heating, that is, the heating time T. The process then shifts to step S203.

In step S203, the display unit 7 displays the moisture content M and the heating time T.

Next, in step S204, the storage unit 8 stores the calculated heating time T as the set heating time Ts, and the processing is completed.

Inspection Mode

Figure 6:
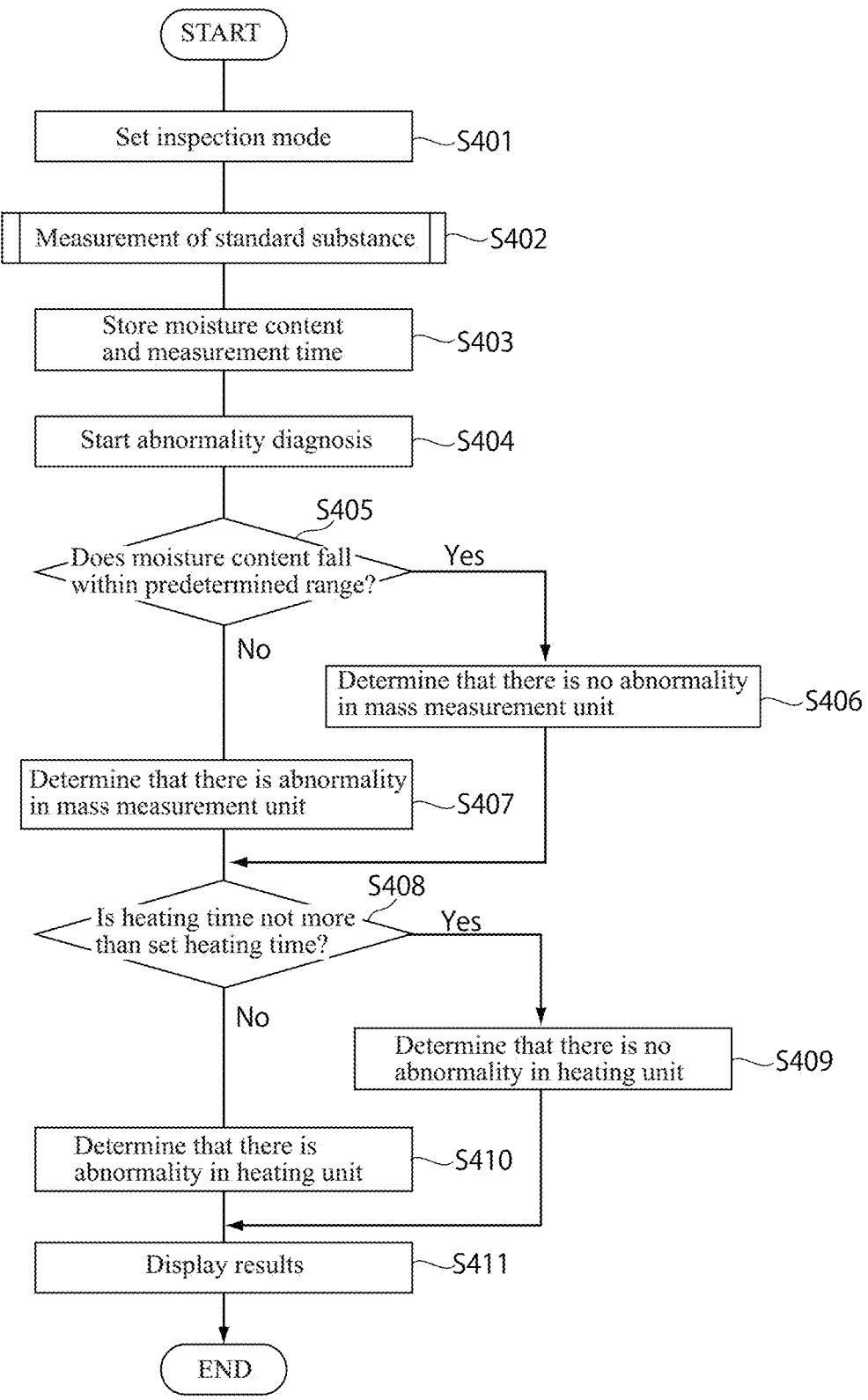
FIG. 6 is a flowchart for an operation in the inspection mode of the same moisture meter.

FIG. 6 is a flowchart for explaining the operation of the moisture meter 100 in the inspection mode. The user of the moisture meter 100 can execute the inspection mode at an arbitrary time when he/she wants to inspect the presence or absence of an abnormality in the moisture meter 100.

In step S401, the user sets the inspection mode via the input unit 6. In step S402, the standard substance measurement unit 52 calculates the measured moisture content Mi of the standard substance and the measured heating time Ti as in steps S301 to S306.

Next, in step S403, the standard substance measurement unit 52 temporarily stores the measured moisture content Mi and the measured heating time Ti, measured in step S402.

Next, in step S404, the abnormality diagnosis unit 53 starts abnormality diagnosis. In step S405, the abnormality diagnosis unit 53 determines whether the measured moisture content Mi of the standard substance calculated in step S402 falls within a predetermined range with reference to the theoretical moisture content Mt. When, for example, sodium tartrate is used, the abnormality diagnosis unit 53 determines whether the moisture content falls within the range of 15.0 to 16.0.

A predetermined range with reference to the theoretical moisture content Mt is set in accordance with the kind of standard substance. For example, a predetermined range may be set like a theoretical moisture content of ±1%.

When the measured moisture content Mi falls within the predetermined range in step S405 (Yes), the abnormality diagnosis unit 53 determines in step S406 that there is no abnormality in the mass measurement unit 2.

In contrast to this, when the measured moisture content Mi falls outside the predetermined range in step S405 (No), the abnormality diagnosis unit 53 determines in step S407 that there is an abnormality in the mass measurement unit 2.

Next, in step S408, the abnormality diagnosis unit 53 compares the measured heating time Ti measured in step S402 with a predetermined time Tp as the set heating time Ts stored in the inspection initialization mode to determine whether the measured heating time Ti is not more than the predetermined time Tp.

Note that the predetermined time Tp may not be strictly the same as the set heating time Ts and may be a time within a certain range such as the set heating time Ts of ±30 sec.

When the measured heating time Ti is not more than the predetermined time Tp in step S408 (Yes), the abnormality diagnosis unit 53 determines in step S409 that there is no abnormality in the heating unit 3.

When the measured heating time Ti is larger than the predetermined time Tp in step S408 (No), the abnormality diagnosis unit 53 determines in step S410 that there is an abnormality in the heating unit 3. Causes for abnormalities in the heating unit 3 include, for example, contamination on the glass cover 9a, contamination on the heating means 3a, and a failure in the heating means 3a.

Next, in step S411, the abnormality diagnosis unit 53 displays diagnosis results on the display unit 7 and completes the processing.

FIGS. 7 and 8 illustrate display examples of diagnosis results displayed on the display unit 7. On each display, the button (highlighted in gray in FIGS. 7 and 8) on the image which is indicated by a black arrowhead 7a is the currently selected button. By selecting this button, a display screen is transitioned.

Figure 7A:
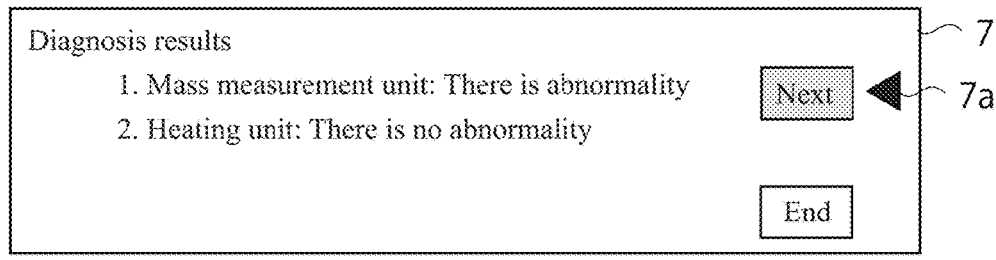
Figures 1, 7B:
Figures 2, 7B:
Figures 1, 7C:
Figures 2, 7C:
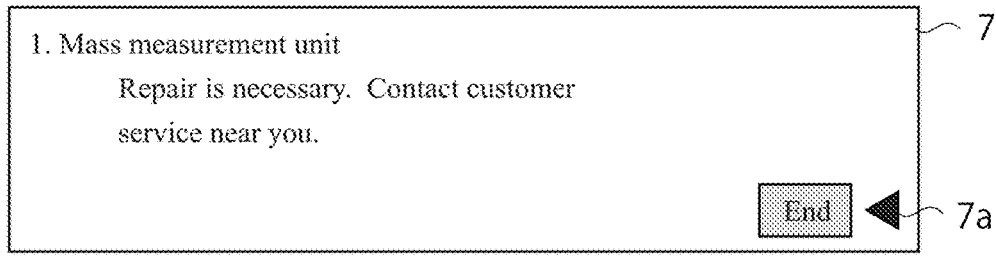

FIG. 7(A) is an example of display when it is determined in step S407 that there is an abnormality in the mass measurement unit 2, and it is determined in step S409 that there is no abnormality in the heating unit 3. When the user selects "Next" in the state of FIG. 7(A), the abnormality diagnosis unit 53 displays, on the display unit 7, a message for checking whether calibration has been performed as illustrated in FIG. 7(B-1).

When no calibration has been performed, the user selects "No." The abnormality diagnosis unit 53 then determines that calibration is necessary and displays a message prompting execution of calibration on the display unit 7 as illustrated in FIG. 7(B-2). Upon checking this message, the user executes calibration and selects the end button. Alternatively, the moisture meter 100 may be configured to automatically execute calibration.

Upon executing the calibration, the user executes measurement in the inspection mode again to check whether the abnormality has been eliminated. If the abnormality has not been eliminated even after the execution of calibration, the user selects "Yes" as illustrated in FIG. 7(C-1).

The abnormality diagnosis unit 53 then determines that the abnormality in the mass measurement unit 2 has not been eliminated even after the execution of calibration and the moisture meter 100 needs to be repaired and displays a message prompting repair as illustrated in FIG. 7(C-2). The user requests repair in accordance with the message.

Figure 8A:
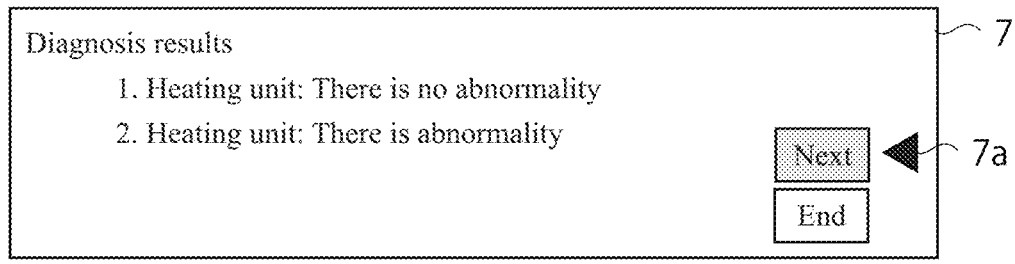
FIGS. 8A-8D are views illustrating examples of a display of abnormality diagnosis results in the inspection mode of the same moisture meter.
Figure 8B:

FIG. 8(A) is an example of display when it is determined in step S406 that there is no abnormality in the mass measurement unit 2, and it is determined in step S410 that there is an abnormality in the heating unit 3. When the user selects "Next" in the state of FIG. 8(A), the abnormality diagnosis unit 53 displays a message prompting cleaning of the glass cover 9a, on the display unit 7, as illustrated in FIG. 8(B), concerning contamination on the glass cover 9a among conceivable causes. Upon checking the message, the user cleans the glass cover 9a and selects "Next."

Figure 8C:

The abnormality diagnosis unit 53 then displays a message prompting cleaning of the halogen lamp (heating means 3a) on the display unit 7, as illustrated in FIG. 8(C), concerning contamination on the heating means 3a among conceivable causes. Upon checking the message, the user cleans the halogen lamp and selects "Next."

Figure 8D:
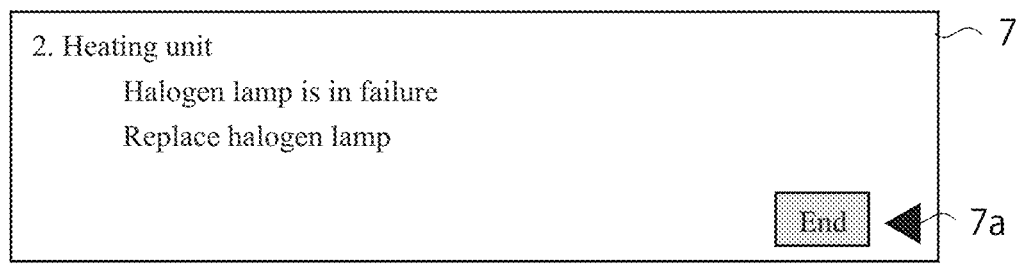

The abnormality diagnosis unit 53 then displays a message prompting replacement of the halogen lamp (heating means 3a) on the display unit 7, as illustrated in FIG. 8(D), concerning a failure in the heating means 3a among conceivable causes. Accordingly, the user makes a request to repair the halogen lamp.

At each of the stages of FIGS. 7(A) to 8(D), the display unit 7 displays the "End" button. By this button, the user may end the display of the diagnosis results halfway and execute measurement again in the inspection mode at his/her discretion.

For example, referring to FIG. 8(B), when the user firmly believes that contamination on the glass cover 9a is the cause and cleaning the glass cover 9a will eliminate the abnormality in the heating unit 3, the user may select "End" and execute measurement in the inspection mode again. This makes it possible to shorten the time required for inspection.

The moisture meter 100 according to the present embodiment is configured to diagnose the presence or absence of an abnormality in the mass measurement unit 2 by measuring the moisture content of the standard substance in the inspection mode and evaluating the measured moisture content Mi with respect to the theoretical moisture content Mt of the standard substance and determine an abnormality in the heating unit 3 by measuring the heating time required for measurement of the moisture content of the standard substance and comparing the measured heating time Ti with the predetermined time Tp as the set heating time Ts at the time of shipment. This makes it possible to diagnose the state of the moisture meter 100 in consideration of not only causes of the mass measurement unit 2 but also causes other than the mass measurement unit 2, especially the state of the heating unit 3.

The moisture meter 100 is configured in particular to compare the measured heating time Ti with the predetermined time Tp as the set heating time Ts in abnormality diagnosis for the heating unit 3 and determine the presence of an abnormality in the heating unit 3 when the measured heating time Ti is longer than the predetermined time Tp. This makes it possible to diagnose the presence of a failure, such as contamination on the glass cover 9a or the halogen lamp (heating means 3a) or a failure in the halogen lamp (heating means 3a), which increases the time required for measurement.

The moisture meter 100 according to the present embodiment is configured such that the abnormality diagnosis unit 53, as diagnosis results, sequentially displays messages notifying the user of the location of an abnormality and a measure against the cause on the display unit 7. This allows the user to perform appropriate processing against an abnormality by acting in accordance with the display even without special knowledge.

Although the preferred embodiments of the present invention have been described, the above embodiments are examples of the present invention. These embodiments can be combined based on the knowledge of a person skilled in the art. Such combined embodiments are also incorporated in the scope of the present invention.

REFERENCE SIGNS LIST

2: Mass measurement unit
2a: Weighing dish
3: Heating unit
4: Timepiece
5: Control arithmetic unit
7: Display unit
8: Storage unit
52: Standard substance measurement unit
53: Abnormality diagnosis unit
100: Moisture meter
C: Heating chamber

The invention claimed is:

1. A moisture meter comprising:
a mass measurement unit configured to measure a mass of a specimen placed on a weighing dish;
a heating chamber having the weighing dish placed inside and configured to open and close;
a heating unit placed in the heating chamber and configured to heat the specimen;
a control arithmetic unit configured to control the heating unit to heat the specimen until a change in mass of the specimen becomes not more than a predetermined threshold and calculate a moisture content of the specimen from the change in the mass of the specimen before and after heating;
a timepiece configured to measure a heating time; and
a storage unit,
wherein the heating unit includes a heater,
wherein the heating chamber includes a glass cover disposed between the specimen and the heater and the glass cover is in a form of a container covering the weighing dish,
wherein the control arithmetic unit includes a standard substance measurement unit configured to measure a moisture content of a standard substance for inspection as the specimen and measure a heating time, and an abnormality diagnosis unit configured to diagnose presence or absence of an abnormality in the heating unit by comparing a measured heating time of the standard substance with a predetermined time as a set heating time of the standard substance stored in the storage unit in advance,
wherein the abnormality diagnosis unit determines that there is an abnormality in the heating unit when the measured heating time is longer than the predetermined time,
wherein the determined abnormality includes contamination on the glass cover, contamination on the heater, and a failure of the heater.

2. The moisture meter according to claim 1, wherein the standard substance is at least one of the group of salts having bonded water of crystallization consisting of sodium tartrate dihydrate, sodium citrate dihydrate, sodium tungstate dihydrate, calcium bromide dihydrate, calcium chloride dihydrate, and sodium dihydrogen phosphate dihydrate.

3. The moisture meter according to claim 2, comprising a display unit,
wherein the abnormality diagnosis unit displays, on the display unit, a message notifying a user of, as diagnosis results, a location of an abnormality and a measure against a cause.

4. The moisture meter according to claim 1, comprising a display unit,
wherein the abnormality diagnosis unit displays, on the display unit, a message notifying a user of, as diagnosis results, a location of an abnormality and a measure against a cause.

5. The moisture meter according to claim 1, wherein the standard substance is a salt having a theoretical moisture content, and wherein the set heating time of the standard substance is the time required to remove the theoretical moisture content from the standard substance.

6. A moisture meter comprising:
a mass measurement unit configured to measure a mass of a specimen placed on a weighing dish;
a heating chamber having the weighing dish placed inside and configured to open and close;
a heating unit placed in the heating chamber and configured to heat the specimen;
a control arithmetic unit configured to control the heating unit to heat the specimen until a change in mass of the specimen becomes not more than a predetermined threshold and calculate a moisture content of the specimen from the change in the mass of the specimen before and after heating;
a timepiece configured to measure a heating time; and
a storage unit,
wherein the heating unit includes a heater,
wherein the heating chamber includes a glass cover disposed between the specimen and the heater and the glass cover is in the form of a container covering the weighing dish,
wherein the control arithmetic unit includes a standard substance measurement unit configured to measure a moisture content of a standard substance for inspection as the specimen and measure a heating time, and an abnormality diagnosis unit configured to diagnose presence or absence of an abnormality in the mass measurement unit by evaluating a measured moisture content with reference to a theoretical moisture content of the standard substance and to diagnose presence or absence of an abnormality in the heating unit by comparing a measured heating time of the standard substance with a predetermined time as a set heating time of the standard substance stored in the storage unit in advance,
wherein the abnormality diagnosis unit determines that there is an abnormality in the heating unit when the measured heating time is longer than the predetermined time, and
wherein the determined abnormality includes contamination on the glass cover, contamination on the heater, and a failure of the heater.

7. The moisture meter according to claim 6, wherein the standard substance is at least one of the group of salts having bonded water of crystallization consisting of sodium tartrate dihydrate, sodium citrate dihydrate, sodium tungstate dihydrate, calcium bromide dihydrate, calcium chloride dihydrate, and sodium dihydrogen phosphate dihydrate.

8. The moisture meter according to claim 7, comprising a display unit,
 wherein the abnormality diagnosis unit displays, on the display unit, a message notifying a user of, as diagnosis results, a location of an abnormality and a measure against a cause.

9. The moisture meter according to claim 6, comprising a display unit,
 wherein the abnormality diagnosis unit displays, on the display unit, a message notifying a user of, as diagnosis results, a location of an abnormality and a measure against a cause.

10. The moisture meter according to claim 6, wherein the standard substance is a salt having a theoretical moisture content, and wherein the set heating time of the standard substance is the time required to remove the theoretical moisture content from the standard substance.

* * * * *